Figures 1, 5:
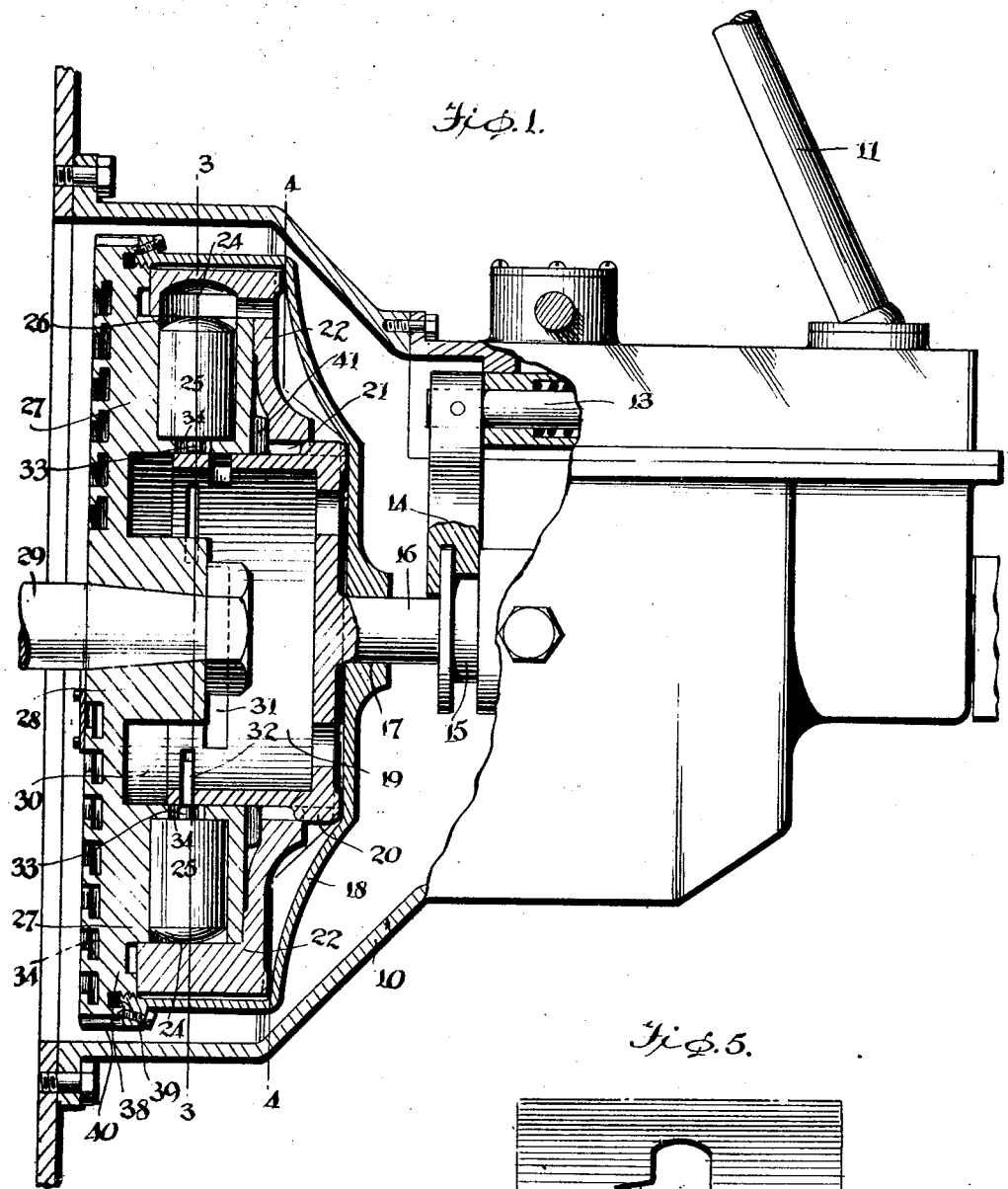

E. R. CARPENTER.
FLUID CLUTCH AND TRANSMISSION.
APPLICATION FILED APR. 7, 1921.

1,436,753.

Patented Nov. 28, 1922.

4 SHEETS—SHEET 1.

WITNESSES

INVENTOR
Eugene R. Carpenter,
BY
ATTORNEYS

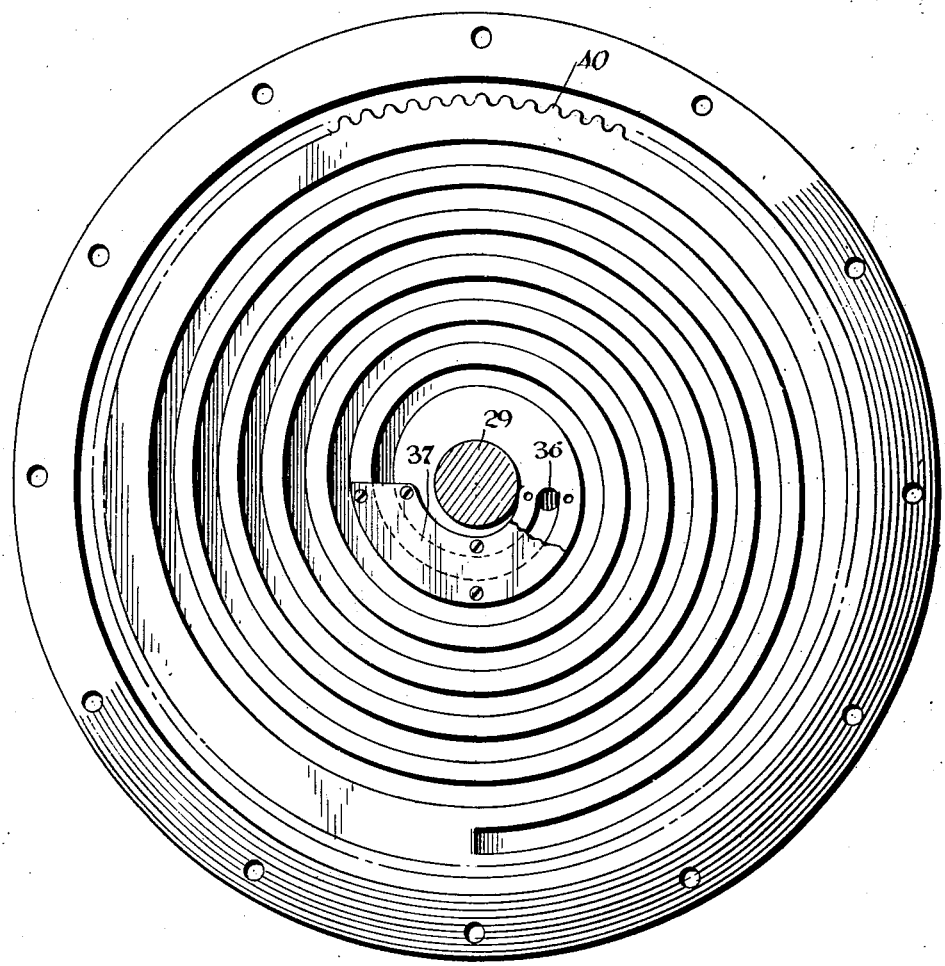

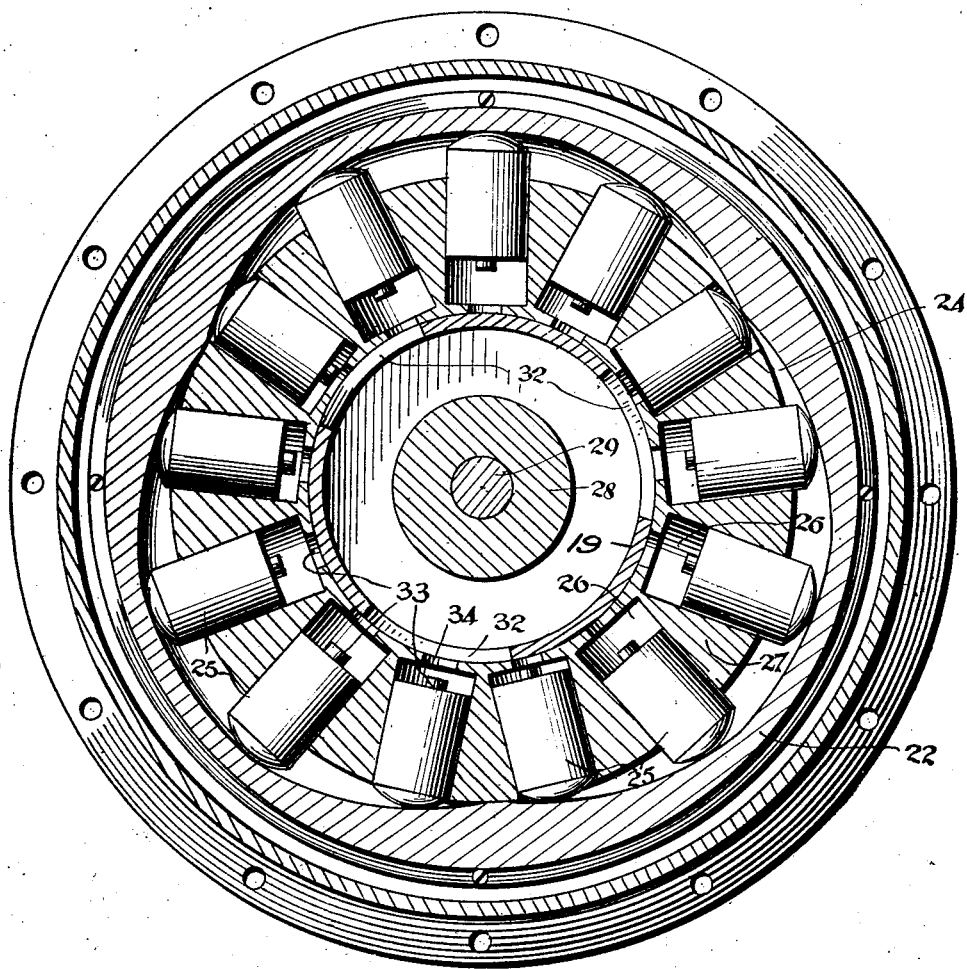

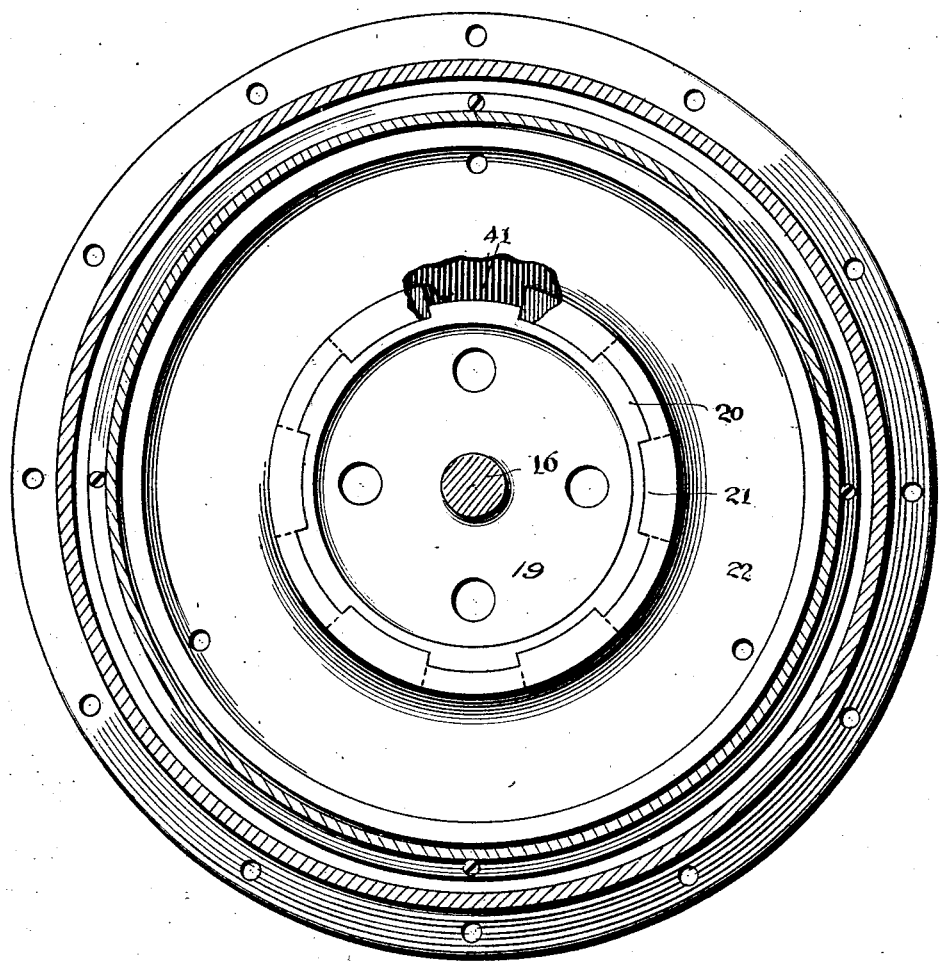

Patented Nov. 28, 1922.

1,436,753

UNITED STATES PATENT OFFICE.

EUGENE ROY CARPENTER, OF ANSONVILLE, NORTH CAROLINA.

FLUID CLUTCH AND TRANSMISSION.

Application filed April 7, 1921. Serial No. 459,472.

*To all whom it may concern:*

Be it known that I, EUGENE ROY CARPENTER, a citizen of the United States, and a resident of Ansonville, in the county of Anson and State of North Carolina, have invented certain new and useful Improvements in Fluid Clutches and Transmissions, of which the following is a specification.

My present invention relates generally to the transmission of power, more especially in connection with automobiles and other motor cars and has for its primary object the provision of an arrangement by which the usual functions of the ordinarily separate transmission and clutch may be combined in a single strong, durable and effectively operating apparatus which will permit of a wide range of variation in speed and power depending upon the requirements.

Other and further objects as well as the resulting advantages of my invention will be apparent in the course of the following description, reference being made to the accompanying drawings in which, Figure 1 is a side view, partly broken away and in section through the apparatus constituting my invention, Figure 2 is a front elevation of the invention, Figure 3 is a vertical transverse section taken on line 3—3 of Figure 1, Figure 4 is a similar view taken on line 4—4 of Figure 1, and Figure 5 is a face view of a portion of the inner surface of the inner clutch member.

Referring now to these figures I have shown my improvements mounted within a transmission case 10, upstanding from which is a lever 11, controlling both clutch and transmission through a slide 13 having at its forward end a collar engaging yoke arm 14. With this yoke arm 14 the collar 15 of a propeller shaft 16 which constitutes the driven member, is rotatably engaged. Forwardly of the collar 15, propeller shaft 16 is journaled to slide and rotate through the axial opening 17 of a flanged housing 18 and has, within this housing, an enlarged cylindrical control member 19 provided therearound at its rear edge with a series of circumferentially spaced teeth 20 slidably disposed between the teeth 21 at the inner rear portion of the outer clutch member 22. This outer clutch member 22 has a forwardly projecting peripheral flange within the housing 18, the inner surface of which flange is provided with an annular groove 24 of quite shallow form at annularly spaced points and gradually deepened from and between these points so as to form a cam shaped inner clutch surface cooperating with a circumferential series of radially shiftable pistons 25 which with their supports form the inner clutch member.

The several pistons 25 are mounted in the radial bores 26 of a clutch wheel 27 having a hub 28 secured upon the rear tapering end of a drive shaft 29, this wheel 27 being cut away inside of its piston receiving portion and around its hub 28 so as to form a chamber 30 within which the controlling member or cylinder 19 slidably and rotatably telescopes. The piston receiving portion of the wheel 27 in turn projects in movable relation within the cam grooved flange of the outer clutch member 22, and the inner ends of the several pistons 25 communicate with the chamber 30 under control of circumferentially spaced and slotted intake and discharge openings 31 and 32 of the controlling cylinder 19, through openings 33 at the inner ends of the several bores 26, each opening 33 having at its forward side a notch 34 as seen in Figure 5, for a purpose to be presently described.

As will be seen by reference to Figure 3, the several slotted outlet openings 32 of the controlling cylinder 19, which are disposed in the same plane and in a plane forwardly beyond the common plane of the several slotted intake openings 31, are disposed opposite the shallow portions of the cam groove 24, the intake openings 31 being disposed between the outlet openings so that with the controlling cylinder 19 properly positioned, the several pistons 25 as they are thrown outwardly into the deep portions of the cam groove 24 by centrifugal movement of the inner clutch member 27, will suck fluid into the inner ends of their bores; 26 through the intake openings 31 while during their movement inwardly within the bores 26 as they pass along the shallow portions of the cam groove 24 they will force such fluid into the interior of the controlling cylinder 19 through the outlet openings 32 of the latter.

With the parts positioned as in Figure 1 however the intake of fluid through the intake openings 31 is prevented in view of the fact that the control member 19 is shifted to its rearmost inactive or unclutched position, with the several intake openings 31 rearwardly of and disalined with respect to the inner openings 33 commuicating with the several bores 26. In this position of the parts the device is thus inactive or unclutched, the inner clutch member 27 being freely rotatable in respect to the outer clutch member 22 by virtue of the fact that the several pistons 25 are freely shiftable inwardly within the several bores 26 in view of alinement of the outlet openings 32 with the before mentioned openings 33.

When however the controlling cylinder 19 is shifted forwardly by manipulation of the clutch and transmission lever 11, to a position where the intake slots 31 come more or less into registry with the inner openings 33 of the bores 26, it is obvious the outlet openings 32 will be shifted forwardly to more or less disaline with the openings 33 so that there will be some fluid at least forced into the piston bores 26 and the exhaust of this fluid will be checked by the more or less disalined outlet openings so as to thus resist to a greater or less extent the passage of this fluid back into the clutch case.

In this way by interposing more or less resistance to the inward movement of the several pistons, more or less speed of rotation will be imparted and this speed will of course depend upon the amount of power required at that particular time, the arrangement of the several parts being obviously of such nature that when the controlling member 19 is shifted forwardly to fully register its intake openings 31 with the openings 33 of the inner clutch member, the outlet openings 32 will be shifted forwardly beyond the openings 33 so that the parts will then be in the full clutched position, fluid being free to find its way into the bores 26 through the intake openings 31 as the pistons move outwardly, but being unable to find its way into the control member so that the pistons will be prevented from shifting inwardly and will thus be held in locked relation against the shallow portions of the cam groove 24.

The fluid utilized for the above purposes may be of any suitable character such for instance as heavy oil or the usual cylinder oil so that by providing the forward surface of the inner clutch member 27 with a spiral groove 35 communicating at its inner end with an opening 36 communicating with chamber 30, the groove being covered at this end by a plate 37, oil collecting in the groove from the splashes of the motor will be fed by the member 27 attached to the driving shaft 29 into the space within controlling cylinder 19 to offset slight leakage of oil around the propeller shaft 16.

In my improved construction the inner clutch member 27 may have a forward annular ring 38 to which the flanged outer portion of the housing 18 is secured, preferably with a packed joint at 39, the outer surface of the ring 38 being toothed as at 40 to present a gear adapted to cooperate with the usual starting gear so that the inner clutch member 27 thus takes the place of the ordinary fly wheel.

In operation as the controlling cylinder 19 is shifted forwardly toward the fully clutched position, the forward notches 34 of the openings 33 permit of a very gradual approach to the fully clutched position depending upon power requirements, and it becomes obvious that my invention thus due to its wide range between fully unclutched and fully clutched positions, combines the functions of the usually separate clutch and transmission, doing away entirely with the ordinary transmission gears except of course for reversing purposes, the clutch itself acting the same in reverse as it does in forward movement. Any suitable reversing arrangement may be utilized.

In its forward movement the controlling cylinder 19 slides through the outer clutch member 22 by virtue of the movement of its teeth 20 between the teeth 21 of said clutch member, and when the controlling cylinder is shifted inwardly to the position of highest speed the clutch members 27 and 22 are locked in connection with the controlling cylinder 19 and thus with the propeller shaft of which this controlling cylinder is a part by virtue of the engagement of the forward portions of the controlling cylinder teeth 20 between rearwardly projecting teeth 41 of the inner clutch member 27 as seen particularly in Figure 1.

I claim:

1. The combination with axially alined driving and driven shafts in endwise spaced relation, a clutch member having connection with the driven shaft and having an outer flanged portion provided with an inwardly facing annular cam groove, a second clutch member having connection with the driving shaft and provided with a piston carrying portion rotatable within the grooved flange of the first clutch member, said piston carrying portion having a plurality of radial piston bores and openings in communication with the inner ends of said bores, pistons shiftable in said bores and whose outer ends are movable in the cam groove of the first clutch member, and a manually actuated fluid control member shiftable axially within the piston carrying portion of the second clutch member and forming with the latter a fluid reservoir said control member having fluid intake and outlet ports in staggered relation therearound whose registry with the fluid openings communicating with the piston bores is controlled by manual shifting of the said control member as described.

2. The combination with axially alined driving and driven shafts in endwise spaced relation, a clutch member having connection with the driven shaft and having an outer flanged porton provided with an inwardly facing annular cam groove, a second clutch member having connection with the driving shaft and provided with a piston carrying portion rotatable within the grooved flange of the first clutch member, said piston carrying portion having a plurality of radial piston bores and openings in communication with the inner ends of said bores, pistons shiftable in said bores and whose outer ends are movable in the cam groove of the first clutch member, and a manually actuated fluid control member shiftable axially within the piston carrying portion of the second clutch member and forming with the latter a fluid reservoir, said control member having fluid intake and outlet ports in staggered relation therearound whose registry with the fluid openings communicating with the piston bores is controlled by manual shifting of the said control member, said control member being of cylindrical form and secured at its axis to the driven shaft and having at its periphery a splined connection with the first named clutch member.

3. The combination with axially alined driving and driven shafts in endwise spaced relation, a clutch member having connection with the driven shaft and having an outer flanged portion provided with an inwardly facing annular cam groove, a second clutch member having connection with the driving shaft and provided with a piston carrying portion rotatable within the grooved flange of the first clutch member, said piston carrying portion having a plurality of radial piston bores and openings in communication with the inner ends of said bores, pistons shiftable in said bores and whose outer ends are movable in the cam groove of the first clutch member, and a manually actuated fluid control member shiftable axially within the piston carrying portion of the second clutch member and forming with the latter a fluid reservoir, said control member having fluid intake and outlet ports in staggered relation therearound whose registry with the fluid openings communicating with the piston bores is controlled by manual shifting of the said control member, said control member being of cylindrical form and secured at its axis to the driven shaft, and said control member and said first named clutch member having relatively engaging toothed portions forming a splined connection therebetween.

4. The combination with axially alined driving and driven shafts in endwise spaced relation, a clutch member having connection with the driven shaft and having an outer flanged portion provided with an inwardly facing annular cam groove, a second clutch member having connection with the driving shaft and provided with a piston carrying portion rotatable within the grooved flange of the first clutch member, said piston carrying portion having a plurality of radial piston bores and openings in communication with the inner ends of said bores, pistons shiftable in said bores and whose outer ends are movable in the cam groove of the first clutch member, and a manually actuated fluid control member shiftable axially within the piston carrying portion of the second clutch member and forming with the latter a fluid reservoir, said control member having fluid intake and outlet ports in staggered relation therearound whose registry with the fluid openings communicating with the piston bores is controlled by manual shifting of the said control member, said control member being of cylindrical form and secured at its axis to the driven shaft, and said control member and said first named clutch member having relatively engaging toothed portions forming a splined connection therebetween of which the teeth of the control member are shiftable through the teeth of the said clutch member, and said piston carrying clutch member also having teeth in an annular series around the control member engageable by the teeth of the control member when the latter is at the limit of its movement in one direction and while its teeth still engage the teeth of the first named clutch member, whereby to lock the two clutch members in relative relation.

5. The combination with driving and driven shafts, a cylindrical control member carried by the driven shaft, a clutch member around the control member and with which the control member has a splined connection, said clutch member being provided with an outer flanged portion having an inwardly presented annular groove of varying depth, a second clutch member secured to the driving shaft and having a piston carrying portion extending laterally therefrom and within which the cylindrical control member is shiftable, said piston carrying portion projecting within the grooved flange of the first clutch member and having an annular series of radial piston bores opening outwardly and also having openings in communication with the inner ends of the said bores, pistons shiftable in the said bores, whose outer ends are movable in the groove of the first clutch member, said cylindrical control member having a series of circumferentially spaced slots movable into and out of registry with the said openings and disposed opposite the deep portions of the said groove and also having a second series of circumferentially spaced slots movable into and out of registry with the said openings, said last named slots being staggered with respect to said first named slots and disposed opposite the shallow portions of the said groove as described.

EUGENE ROY CARPENTER.